Patented June 24, 1930

1,765,662

UNITED STATES PATENT OFFICE

WILHELM ECKERT AND HEINRICH GREUNE, OF FRANKFORT-ON-THE-MAIN-HOCHST, GERMANY, ASSIGNORS TO GENERAL ANILINE WORKS, INC., OF NEW YORK, N. Y., A CORPORATION OF DELAWARE

DERIVATIVES OF 1,4,5,8-NAPHTHALENE TETRACARBOXYLIC ACID AND PROCESS OF PREPARING IT

No Drawing. Original application filed January 27, 1927, Serial No. 164,125, and in Germany August 30, 1926. Divided and this application filed October 9, 1928. Serial No. 311,414.

Our present invention relates to new derivatives of 1.4.5.8-naphthalene tetracarboxylic acid and to a process of preparing them.

We have found that by causing an ortho-diamines compound to act upon the dianhydride of 1.4.5.8-naphthalenetetracarboxylic acid or upon the free acid in the presence of a solvent of a low boiling point, such as alcohol or the like, products are obtainable the constitution of which is not exactly known. The said products can be converted into valuable vat dyestuffs by heating them in the dry state up to their boiling point or by heating them in the presence of a solvent of a high boiling point.

The following example illustrates our invention but is not meant to limit the invention thereto; the parts being by weight:

10 parts of the dianhydride of 1.4.5.8-naphthalenetetracarboxylic acid are heated to boiling on the reflux condenser in 50 parts of alcohol with 8 parts of ortho-phenylenediamine. After some hours, the mass is filtered by suction, washed with alcohol until the alcohol running off becomes colorless and then dried.

The product thus obtained forms a brownish mass which, on addition of concentrated hydrochloric acid, yields a yellow sparingly soluble hydrochloride. Said brownish mass dissolves in concentrated sulfuric acid to a yellowish-brown solution which when poured on water remains golden-yellow. It gives a wine-red leuco compound and dyes cotton very weak orange tints. The product has probably the formula:

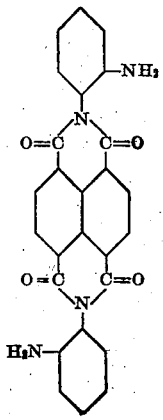

10 parts of the condensation product thus obtained are introduced into glacial acetic acid, and the whole is then heated to boiling. After a short time, the mass assumes an intensely red coloration and the dyestuff separates. The latter is then filtered by suction, washed with water and dried. It forms a red powder which dissolves in concentrated sulfuric acid to yellowish-brown solution and gives a green vat which dyes cotton on exposure to the air a brilliant red tint.

The vat dyestuff has most probably one of the following formulae:

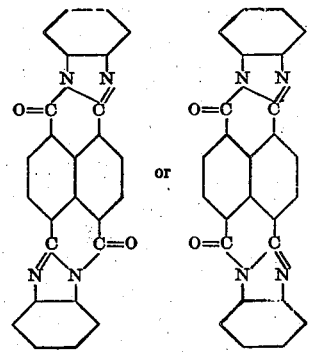

Instead of treating the intermediate product in glacial acetic acid, it may also be heated alone in a dry state to about 150° C. whereby it becomes deep-red and eliminates water. Instead of glacial acetic acid, any other solvent or diluent of a high boiling point may be used.

This application is a division of our application Serial Number 164,125, filed January 27th, 1927.

In the following claims we understand by the term "1.4.5.8-naphthalenetetracarboxylic acid compound" not only this acid itself, but also its anhydride and by the term "an ortho-diamine compound" we understand the ortho-diamines and the salts thereof.

We claim:

1. The process which comprises treating with an orthodiamine compound a 1.4.5.8-naphthalenetetracarboxylic acid, compound in the presence of a diluent at a temperature below 100° C.

2. The process which comprises treating with an orthodiamine compound the compound of the following formula:

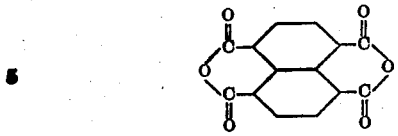

in the presence of a diluent at a temperature below 100° C.

3. The process which comprises treating with orthophenylenediamine the compound of the following formula:

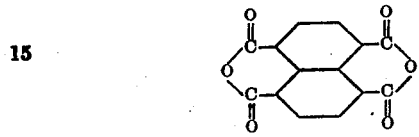

in the presence of a diluent at a temperature below 100° C.

4. The process which comprises treating for some hours with orthophenylenediamine the compound of the folowing formula:

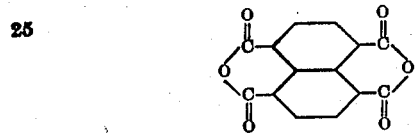

in the presence of boiling ethyl alcohol.

5. As a new product the compound of the probable formula:

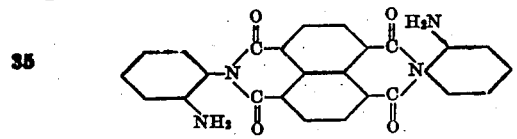

said product forming a brownish mass, yielding on addition of concentrated hydrochloric acid a yellow sparingly soluble hydrochloride, dissolving in concentrated sulfuric acid to a yellowish-brown solution which when poured on water remains clear golden-yellow, giving a wine-red leuco compound, dyeing cotton very weak orange tints and being, when treated with boiling glacial acetic acid or other diluents or solvents, having a boiling point more than 100° C. or when treated in a dry state without using any solvent at a temperature higher than 100° C. converted into a red vat-dyestuff which yields a green leucocompound and dyes cotton deep-red tints.

6. As new products the compounds which are obtainable by heating an ortho-diamine compound with a 1.4.5.8-naphthalene-tetracarboxylic acid compound in the presence of a diluent at a temperature below 100° C.

In testimony whereof, we affix our signatures.

WILHELM ECKERT.
HEINRICH GREUNE.